United States Patent
Dorsch et al.

(10) Patent No.: US 10,089,883 B2
(45) Date of Patent: Oct. 2, 2018

(54) MONITORING SYSTEM FOR MONITORING A WATERCRAFT OR SEVERAL WATERCRAFTS AS WELL AS A PROCESS FOR VERIFYING A WATERCRAFT OR SEVERAL WATERCRAFTS

(71) Applicant: ATLAS ELEKTRONIK GMBH, Bremen (DE)

(72) Inventors: Wolfgang Dorsch, Leer (DE); Rolf Müller, Bremen (DE); Heiko Schmidt, Langwedel (DE)

(73) Assignee: ATLAS ELEKTRONIK GMBH, Bremen (DE)

( * ) Notice: Subject to any disclaimer, the term of this patent is extended or adjusted under 35 U.S.C. 154(b) by 159 days.

(21) Appl. No.: 15/115,561

(22) PCT Filed: Jan. 14, 2015

(86) PCT No.: PCT/DE2015/100020
§ 371 (c)(1),
(2) Date: Jul. 29, 2016

(87) PCT Pub. No.: WO2015/120838
PCT Pub. Date: Aug. 20, 2015

(65) Prior Publication Data
US 2017/0132936 A1    May 11, 2017

(30) Foreign Application Priority Data
Feb. 14, 2014  (DE) .................. 10 2014 101 902

(51) Int. Cl.
*G08G 3/00*    (2006.01)
*H04B 11/00*   (2006.01)
*G01S 3/808*   (2006.01)

(52) U.S. Cl.
CPC ............... *G08G 3/00* (2013.01); *G01S 3/808* (2013.01); *H04B 11/00* (2013.01)

(58) Field of Classification Search
CPC .................. G08G 3/00; H04B 11/00
See application file for complete search history.

(56) References Cited

U.S. PATENT DOCUMENTS

| | | | |
|---|---|---|---|
| 5,245,589 A * | 9/1993 | Abel | G01R 23/16 367/124 |
| 5,430,690 A * | 7/1995 | Abel | G01R 23/16 367/124 |

(Continued)

FOREIGN PATENT DOCUMENTS

| | | |
|---|---|---|
| WO | 2011/138744 A2 | 11/2011 |
| WO | 2014/023293 A1 | 2/2014 |

OTHER PUBLICATIONS

International Search Report for PCT/DE2015/100020 dated Jun. 18, 2015; English translation submitted herewith (7 Pages).

(Continued)

*Primary Examiner* — Daniel Pihulic
(74) *Attorney, Agent, or Firm* — Fitch, Even, Tabin & Flannery, LLP

(57) ABSTRACT

The invention relates to a monitoring system for monitoring a watercraft or several watercrafts, having an identification device and a first hydrophone, which is configured such that acoustic signals that are emitted by watercrafts are determined as underwater sound information therein, whereby the identification device has a first memory for storing the underwater sound information and a second memory for storing watercraft information, whereby the first and second memories are interconnected, characterized in that the first hydrophone is arranged in a stationary and fixed manner.

17 Claims, 1 Drawing Sheet

(56) References Cited

U.S. PATENT DOCUMENTS

| | | | |
|---|---|---|---|
| 5,995,445 A * | 11/1999 | Whitesell | G01S 3/801 367/129 |
| 6,850,173 B1 | 2/2005 | Steinbrecher | |
| 2006/0244826 A1 | 11/2006 | Chew | |
| 2008/0260467 A1 | 10/2008 | Kroecker et al. | |
| 2017/0132936 A1 * | 5/2017 | Dorsch | G08G 3/00 |

OTHER PUBLICATIONS

German Patent Office, Search Report, dated Jan. 23, 2015, issued in DE 10 2014 101 902.4.

* cited by examiner

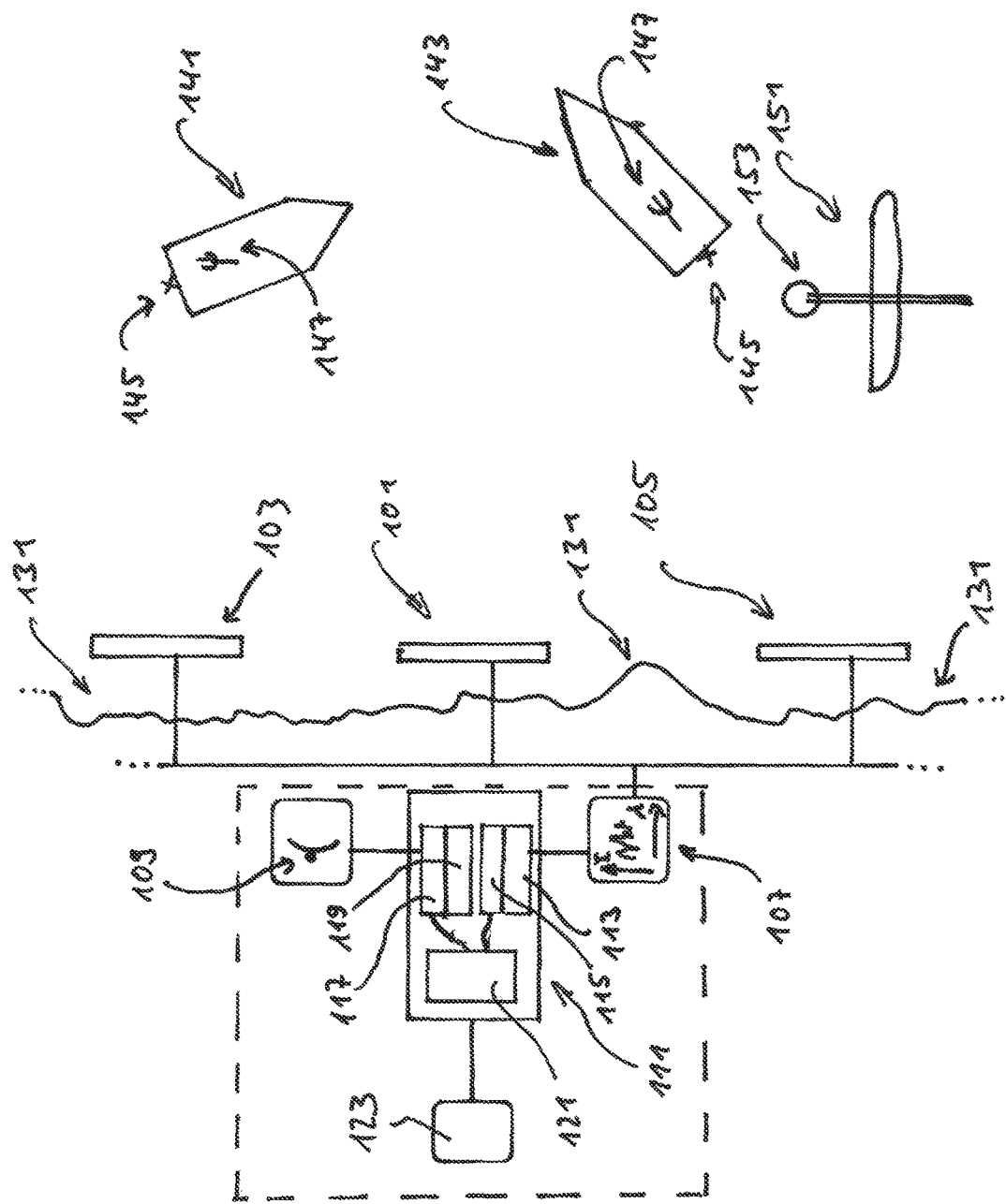

MONITORING SYSTEM FOR MONITORING A WATERCRAFT OR SEVERAL WATERCRAFTS AS WELL AS A PROCESS FOR VERIFYING A WATERCRAFT OR SEVERAL WATERCRAFTS

CROSS-REFERENCE TO RELATED APPLICATIONS

This application is a U.S. national phase application filed under 35 U.S.C. § 371 of International Application No. PCT/DE2015/100020, filed Jan. 14, 2015, designating the United States, and claims priority from German Patent Application No. 10 2014 101 902.4, filed Feb. 14, 2014, and the complete disclosures of which applications are hereby incorporated herein by reference in their entirety for all purposes.

FIELD

The invention relates to a monitoring system for monitoring a watercraft or several watercrafts, having an identification device and a first hydrophone, which is configured such that acoustic signals that are emitted by watercrafts are determined as underwater sound information therein, whereby the identification device has a first memory for storing the underwater sound information and a second memory for storing watercraft information, whereby the first and second memories are interconnected, and a process for verifying a piece of transmitted watercraft information from a watercraft as well as a device for performing the process.

BACKGROUND

Large cargo vessels in particular transmit an identification signal, which forwards information about the ship, its position and speed, for example, to a coastal surveillance unit. Such information systems are designated, for example, as AIS (Automatic Identification System) or UAIS (Universal Automatic Identification System) and are usually based on radio transmission. By means of this transmitted signal, other vessels in the vicinity are also aware of the ships and their courses in the vicinity.

However, the problem with such systems is that they can be easily counterfeited. Especially in case of piracy, such radio signals can be completely switched off, or a ship signature can be transmitted to an entirely different ship, so that finding the captured ship can be very difficult.

In addition, marine traffic is monitored by radar systems. These radar systems are based on reflected radio waves, which are used to establish the size and distance of a ship. By tracking the ship over time, the course of the ship can also be determined by these means.

The problem with a radar monitoring system is that it relies on establishing a "line of sight", as radio waves are generally not reflected back over the Earth's curvature. Thus, tracking a ship over the horizon is not possible. The AI and radar systems are used in parallel or supplementary to each other.

SUMMARY

The invention is based on improving state of the art.

The task is solved by a monitoring system for monitoring a watercraft or several watercrafts, having an identification device and a first hydrophone, which is configured such that acoustic signals that are emitted by watercrafts are determined as underwater sound information therein, whereby the identification device has a first memory for storing the underwater sound information and a second memory for storing watercraft information, whereby the first and second memories are interconnected and the first hydrophone is arranged in a stationary and fixed manner.

In this way, a monitoring system can be provided, which enables vessel identification and course tracking to be performed even over the horizon. Additionally, ships can be identified and recognized. Also, non-functional AI or UAI systems can be compensated by such a monitoring system in a partly redundant manner, and safer marine traffic can be ensured.

The following terms need explanation:

"Watercrafts" are all vessels moving on and/or under the water, which emit a characteristic underwater sound signature, for example, due to the rotors of the ship. Platforms and buoys are also included.

The "identification device" enables determining the underwater sound signature on the one hand, and saving said signature as well as assigning an underwater sound signature to exactly one watercraft, on the other hand. Thus, the identification device comprises at least one computer with a database system. The database system, however, can be very rudimentary or it can comprise a relational database.

The invention is based on the insight that every watercraft emits a very specific, significant underwater sound signature. Thus, this underwater sound signature serves as a type of fingerprint, which enables the exact identification of a ship. Even ships of the same type can be differentiated, as the smallest deviations in the drive train lead to a different underwater sound signature.

A "hydrophone" is sometimes also designated as a passive sonar. As the provided hydrophones are fixed and stationary, they can also monitor a broad frequency range. In particular, such hydrophones can display an expansion over several hundred meters, so that low frequencies can also be detected. These low frequencies in particular can be detected over the horizon, so that the underwater signal of a watercraft can be tracked beyond this area as well. These hydrophones can be arranged especially in such a water layer, which conducts the underwater sound in a particularly effective manner, for example, due to its salinity.

The identification device comprises in particular a computer with a "first memory" and a "second memory". In the first memory, the previously described underwater sound signature of a vessel is stored in particular. In the second memory, further information regarding the ship can be stored. The ship type and the ship designation are stored in particular. In addition, further information like cargo, flag and/or course can be contained therein. This vessel information is automatically filled-in via the AI system, particularly during the first contact.

By means of the unambiguous allocation of the first memory and the second memory, the ship information and the underwater sound signature (in the present example also called underwater sound information) are linked to each other.

Thus, the ship can be unambiguously identified as soon as the underwater sound information is received again. Also, as soon as a watercraft enters the monitoring area, it can be recognized and tracked.

In this case, it is essential that the hydrophone be firmly embedded in the ground. Such an embedding—in the following this kind of embedding is referred to as "stationary" and "fixed"—can be performed directly in the seabed or indirectly along a port wall.

In order to determine the exact location and/or course of a watercraft, a second hydrophone can be provided, which is arranged in a stationary and fixed manner at a microphone distance from the first hydrophone. For this hydrophone, it must also be ensured that it is always covered by water and embedded in the ground in such a way that it substantially does not perform any movements. Furthermore, this hydrophone can possess entirely the same features as the first hydrophone.

In a further embodiment, a third and/or a fourth or additional hydrophones are provided that are respectively arranged in relation to each other or to the first hydrophone or the second hydrophone at a hydrophone distance and in a stationary and fixed manner.

Thus, the location or course can be better determined. In any case, the resolution of the monitoring system is enhanced. All hydrophones can be equipped similar to the first hydrophone or have additional characteristics.

In order to better monitor individual coastal sections, the hydrophone distances between the individual hydrophones can vary as appropriate. In addition to that, for example in a canal, the hydrophones can be arranged opposite each other.

In order to optimally cover a large sea area, a value for the hydrophone distance can range between 100 m and 100 km, particularly between 500 m and 50 km or between 1 km and 20 km.

In a further design, the monitoring system is equipped with a classification device that determines the watercraft information of one of the watercrafts.

Such a classification device can be, for example, an AIS or a UAIS.

In principle, the classification system contains ship information that is independent from the underwater sound information. Notably, comparing these independent sets of information enables one to recognize, for example, dangerous situations.

In particular, the classification device recognizes sets of information sent out from the watercraft in an autonomous manner.

In order to be able to provide alternatives for the identification of watercrafts, the classification device can be equipped in such a way that optical information and/or radio information (e.g. radar) is used for determining the watercraft information.

In case of optical information in particular, cameras with downstream automatic recognition systems can be used, which can identify ships similarly to an OCR system. Also, for example, writing on a ship can be recognized by a camera using OCR, thus ship information can also be obtained in this way.

In order to ensure ship identification or perform an alternative ship identification, the classification device or parts of the classification device can be arranged on an unmanned vehicle, particularly on a drone, a satellite, an autonomous watercraft or an autonomous underwater vessel.

Particularly in case of deviations between the AIS watercraft information and the ship information stored with the underwater sound information, separate verification by means of such an unmanned vehicle can occur.

Also, the unmanned vehicle can—independently of a possible AIS, which is not necessarily provided with every watercraft—perform an identification, which, particularly in this case, can store a set of watercraft information in the second memory of the identification device.

Additionally, the task is solved by a method for the verification of a transmitted watercraft information of a watercraft, particularly of an AIS signal, whereby the method is performed particularly by a monitoring system described above and comprises the following steps:

Determining the transmitted watercraft information of the watercraft and identifying the watercraft;

determining a piece of measured underwater sound information of the watercraft;

comparing the measured underwater sound information with a piece of reference underwater sound information of the identified watercraft and;

displaying a piece of deviation information, if the measured underwater sound information differs from the reference underwater sound information.

Thus, counterfeit AIS information in particular can be identified. Also, captured ships that send out counterfeit AIS information can be identified and tracked. In this way, an effective tool for the fight against terrorism can be provided at present.

The following terms need explanation:

"Transmitted watercraft information" comprises all transmitted active and passive pieces of watercraft information that are not based on underwater sound information. This particularly covers information of the AI systems and UAI systems.

The previously stated definitions apply here in a similar fashion.

Determining the transmitted watercraft information means, for example, analyzing an AI system and thus identifying the transmitted information. By means of this information, the specific watercraft is identified.

Measured underwater sound information is particularly sound information that is determined by means of fixed stationary and particularly embedded hydrophones. Here, the key concept of the invention also lies in the fact that every ship can be identified by means of its underwater sound information (underwater sound signature).

Reference underwater sound information refers to underwater sound information that was previously stored in the memories for the identified watercraft.

A comparison between the measured underwater sound information and the reference underwater sound information is performed, for example, by means of autocorrelation, so that certain changes in an underwater sound signature are harmless. If the established autocorrelation value falls below a certain threshold value, the comparison is classified as failed and a piece of deviation information is issued. This piece of "deviation information" can, for example, be displayed on a screen in the form of an alarm.

Thus, harbor authorities or coastal surveillance authorities can take respective measures in order to ward off possible dangers in advance.

In another embodiment, the task is solved by a device that is configured in such a way as to enable performing the method described above.

BRIEF DESCRIPTIONS OF THE DRAWINGS

The invention is further explained using embodiment examples. What is depicted, is:

FIG. 1 a schematic representation of a monitoring system, arranged on a coast, with two monitored ships.

DETAILED DESCRIPTION

A coastal monitoring system comprises three hydrophones 101, 103, 105, which are embedded in the ground in a fixed manner underneath the water surface along a coastal line 131. The longest extension of the hydrophones 101, 103, 105 along the coastline is approx. 450 meters. Each hydrophone 101, 103, 105 is equipped with piezoelectric ceramics, which transform an underwater sound signal into voltages, which are processed by an electronic device (not depicted).

All hydrophones 101, 103, 105, are allocated to a processing unit 107, which processes the underwater sound signals detected by the hydrophones 101, 103, 105 according to their intensity and wavelength. The functions of intensity and wavelength ($I(\lambda)$) can be stored in a memory 113 of a computer.

The computer is additionally equipped with a memory 115, which contains ship information. In addition to that, the monitoring system is equipped with a radio antenna 109, which can receive transmitted AIS signals. These AIS signals are analyzed and the transmission memory information is stored in memory 117, whereas the associated ship information is stored in memory 119.

The database computer 111 has a comparison unit 121. This comparison unit 121 compares the reference ship information that is stored in the transmitted ship information memory 119 with the signature ship information memory 115, which contains a measured ship signature.

Additionally, the computer is equipped with a screen 123, on which the information from the memories 113, 115, 117, 119 and the comparison information 121 is displayed.

In the present example, two ships 141, 143 are moving on the water surface on a particular course. Each ship 141, 143 has a rotating propeller 145. Additionally, the ships 141, 143 have each an AIS transmitter, which particularly transmits AIS information to the radio receiver 109. The monitoring system can additionally be connected to an air drone 151, whereby the air drone is equipped with a camera system 153.

In the present example, the ship 141 is transmitting a correct AIS signal. This AIS signal is transmitted by the AIS transmitter 147. These radio signals are received by the radio receiver 109, which extracts the respective information. This information is written into the memories 117, 119.

Subsequently, a query is sent to the database computer 111, asking whether underwater sound information already exists as a reference for the identified ship 141.

In addition to that, the hydrophones 101, 103, 105 record the underwater sound signal of the ship 141, which is created by the ship propeller 145, so that a measured underwater sound signature of the ship 141 is obtained. The determination of the ship signature is performed by the processing unit 107. This ship signature (measured value) is compared to all ship signatures saved in the database (reference values) by means of autocorrelation.

As in the present example, the autocorrelation level is above 0.9; the ship is identified.

Due to the fact that the hydrophones 101, 103, 105 have a distance of approx. 10 kilometers, it is possible to determine the location of the ship 141 over time, and thus the course of the ship 141. Even after the ship 141 has disappeared over the horizon, it continues to transmit underwater sound signals, which enable the determination of the ship's location and the shipping route.

The ship 143 is not yet known to the coastal monitoring system. The ship 143 transmits a radio signal via its AIS antenna 147 to the radio receiver 109, which analyzes the transmitted information. Simultaneously, the transmitted position information that was also determined and compared by the hydrophones 101, 103, 105 is linked with the sound signature that was determined by the hydrophones and stored in the memories, along with a link to the newly found ship 143.

The ship continues to be tracked on its course over the horizon. In the present example, after the ship has left the reach of the monitoring system, it comes back into the monitoring range of the monitoring system, whereby this time it has been captured by terrorists, who have manipulated the AIS in such a way that it is transmitting a counterfeit AIS signature.

Again, the AIS information is received by the antenna 109 and the sound signatures created by the ship propeller 145 are determined by the hydrophones 101, 103, 105.

This sound information is autocorrelated with all known sound information, which leads to the realization that the ship should be a different one than the transmitted AIS information suggests.

After that, an air drone 151 is started, which flies along the course of the ship 143. The air drone 151 is equipped with a camera system, which records the automatic images of the ship 143. This camera information is transmitted to the radio receiver via radio signals. At this point, automated software can determine the ship type or recognize the written letters on the ship's side via OCR.

Should the information still not provide sufficient clarity, the coast guard or the military is informed, in order to conduct an identity check of the people on board the ship.

The invention claimed is:

1. A monitoring system for monitoring at least one watercraft, said monitoring system having an identification device and a first hydrophone, which is configured such that acoustic signals that are emitted by said at least one watercraft are determined as underwater sound information therein, said identification device having a first memory for storing the underwater sound information and a second memory for storing watercraft information, wherein the first and second memories are interconnected, and the first hydrophone is arranged in a stationary and fixed manner.

2. The monitoring system according to claim 1, wherein the monitoring system further comprises a second hydrophone, which is arranged in a microphone distance to the first hydrophone in a stationary and fixed manner.

3. The monitoring system according to claim 2, wherein the monitoring system further comprises at least one additional hydrophone respectively arranged with respect to the first hydrophone or the second hydrophone in a hydrophone distance and in a stationary and fixed manner.

4. The monitoring system according to claim 3, wherein the respective hydrophone distances have different values.

5. The monitoring system according to claim 3, one value for the hydrophone distance lies between (a) 100 m and 100 km, (b) between 500 m and 50 km or (c) between 1 km and 20 km.

6. The monitoring system according to claim 1, wherein the monitoring system further comprises a classification device for determining the watercraft information of the at least one watercraft.

7. The monitoring system according to claim 6, wherein the classification device is configured in such a way that optical information and/or radio information is used for determining the watercraft information.

8. The monitoring system according to claim 6, wherein at least parts of the classification device can be arranged on (a) an unmanned vehicle, (b) on a satellite, (c) on an autonomous watercraft or (d) on an autonomous underwater vessel.

9. A method for the verification of a transmitted watercraft information of a watercraft, particularly of an AIS signal, whereby the method is performed by a monitoring system for monitoring at least one watercraft, said monitoring system having an identification device and a first hydrophone, which is configured such that acoustic signals that are emitted by said at least one watercraft are determined as underwater sound information therein, said identification device having a first memory for storing the underwater sound information and a second memory for storing watercraft information, wherein the first and second memories are interconnected, and the first hydrophone is arranged in a stationary and fixed manner, said method comprising the following steps:

determining the transmitted watercraft information of the watercraft and identifying the watercraft;

determining a piece of measured underwater sound information of the watercraft;

comparing the measured underwater sound information of the identified watercraft with reference underwater sound information of the identified watercraft; and displaying a piece of deviation information, if the measured underwater sound information of the identified watercraft differs from the reference underwater sound information for the identified watercraft.

10. Device that is configured in such a way as to enable a method according to claim 9 to be performed on it.

11. The monitoring system according to claim 2, wherein said monitoring system further comprises at least a third hydrophone and a fourth hydrophone, said third and fourth hydrophones spaced at a distance with respect to the first and second hydrophones at a hydrophone distance and in a stationary and fixed manner.

12. The monitoring system according to claim 11, wherein one value for the distance lies between (a) 100 m and 100 km, (b) between 500 m and 50 km or (c) between 1 km and 20 km.

13. The monitoring system according to claim 12, wherein the distance at which the hydrophones are spaced apart from each other is not the same.

14. The monitoring system according to claim 11, wherein the monitoring system further comprises a classification device for determining the watercraft information of the at least one watercraft.

15. The monitoring system according to claim 11, wherein the classification device for determining the watercraft information utilizes optical information, radio information or a combination thereof in determining the watercraft information.

16. The monitoring system according to claim 1, wherein the monitoring system further comprises a system for receiving identification signals transmitted by the at least one watercraft and for analyzing the received identification signals, and which is configured to store the received signals in a third memory and to store ship information associated with received signals in a fourth memory; and a comparison system configured to compare the information associated with the received identification signals from the fourth memory with measured signature information comprising underwater sound information from the first memory.

17. The monitoring system according to claim 6, wherein the at least one watercraft comprises a ship, and the classification device comprises an antenna configured to receive AIS signals transmitted by the ship, a memory to store analyzed AIS signals as transmission information, and a memory to store associated ship information.

\* \* \* \* \*